(12) United States Patent
Mills, Jr. et al.

(10) Patent No.: US 7,679,307 B2
(45) Date of Patent: Mar. 16, 2010

(54) ELECTRONIC METHOD FOR STARTING A COMPRESSOR

(75) Inventors: Eugene L. Mills, Jr., Avon, IN (US); Rajendra K. Shah, Indianapolis, IN (US); Lynn A. Turner, Avon, IN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 12/158,440

(22) PCT Filed: Jan. 20, 2006

(86) PCT No.: PCT/US2006/002446

§ 371 (c)(1),
(2), (4) Date: Jun. 20, 2008

(87) PCT Pub. No.: WO2007/089140

PCT Pub. Date: Jul. 26, 2007

(65) Prior Publication Data

US 2009/0001921 A1 Jan. 1, 2009

(51) Int. Cl.
*H02P 1/42* (2006.01)
(52) U.S. Cl. .................. 318/785; 318/748; 318/795
(58) Field of Classification Search ................. 318/785, 318/748, 795, 794, 778, 781, 782
See application file for complete search history.

(56) References Cited

U.S. PATENT DOCUMENTS 6,318,966 B1 * 11/2001 Madara et al. ................. 417/12

OTHER PUBLICATIONS

International Search Report and Written Opinion mailed May 31, 2006 (12 pgs.).
International Preliminary Report on Patentability mailed May 2, 2008 (5 pgs.).

* cited by examiner

*Primary Examiner*—Karen Masih
(74) *Attorney, Agent, or Firm*—Marjama Muldoon Blasiak & Sullivan LLP

(57) ABSTRACT

A motor starting apparatus (10) includes a motor starting relay (112) to switch a motor starting capacitor (110) into a motor circuit across a run capacitor (111). The system control (116) includes an electronic voltage measurement circuit to measure a winding voltage (113, 114) of the motor winding (102, 103). The system control (116) also includes a microprocessor to run an algorithm that causes the system control to switch the starting capacitor (110) out of the motor circuit when a measured winding voltage (113, 114) exceeds a winding voltage threshold. A method to start a motor includes the steps of determining a motor winding voltage (113, 114) threshold; closing the motor starting capacitor relay (112) when needed; closing a contactor (108, 109) to supply power to the motor starting apparatus and the motor circuit; measuring a winding voltage (113, 114); comparing the measured winding voltage (113, 114) to the voltage threshold; and opening the starting capacitor relay (112) when measured winding voltage (113, 114) exceeds the voltage threshold indicating that the motor has been started.

20 Claims, 5 Drawing Sheets

ELECTRONIC METHOD FOR STARTING A COMPRESSOR

FIELD OF THE INVENTION

This invention relates generally to a method and apparatus to start a capacitor-start capacitor-run motor, and more particularly to start a reversible CSCR motor used to drive a compressor.

BACKGROUND OF THE INVENTION

An electric motor is typically used to drive the shaft of a compressor used in heating ventilation and air conditioning (HVAC) systems. The electric motor can be an alternating current (AC) capacitor-start capacitor-run (CSCR) motor. CSCR motors can conveniently run on single phase AC power, such as between the lines of a standard 230 V AC commercial or residential power system. A CSCR AC motor has two windings, a "run" winding and a "start" winding. Motion is created in the rotor of the motor by causing a phase difference between the AC electrical currents in the two windings. This phase difference is caused by introducing a capacitor in series with one of the windings.

A CSCR motor is started by momentarily introducing a larger capacitance to provide a high mechanical starting torque. Once the rotor speed is up to a desired speed, the starting capacitance is typically switched out of the circuit by a relay, leaving a smaller value run capacitor in circuit to establish the correct phase relationship between the start and the run winding for continuous operation. Typically, the voltage across one of the windings, usually the start winding, is monitored by use of a potential relay to determine when to open the start capacitor relay. If the start capacitor relay is opened too soon before the motor has achieved a sustainable shaft rotation speed, the motor will stall when the start capacitor relay is opened. If the start capacitor relay is opened too late, the winding currents and voltages can become excessively high potentially causing high temperatures, damaging mechanical stresses, and insulation breakdown. The accuracy of potential relays is only about 20 VAC which limits the ability to accurately time the opening of the start capacitor contactor. What is needed is a system to more accurately match the opening of the motor start relay to a desired mechanical rotor condition. The mechanical rotor condition can also be influenced by line voltage, ambient temperature, motor temperature, and compressor condition, such as how recently the compressor was run. Therefore, there is also a need for a system to vary the operation of the motor start capacitor relay to compensate for factors such as line voltage, ambient temperature, motor temperature, or compressor operating conditions.

Another desirable feature of CSCR motors is that they can be operated as reversible motors where the shaft can be powered to turn clockwise or counter clockwise. The rotation direction can be forced by setting the phase of the current in the run winding to lead or lag the phase of the current in the start winding. This can be accomplished by placing a capacitor in series with one or the other winding and directly connecting the remaining winding across the powering voltage (typically two lines of a three phase power source). Such switching can be accomplished by using two sets of contacts, usually in the form of contactors, one for a forward rotation and one for reverse motor shaft rotation.

Two directions of rotational direction are particularly desirable for driving the compressor shaft of modern compressors. Such compressors can make use of a compressor shaft technology where when the shaft rotated in different directions, the compressor generates two different rates of compression. The principle of operation is that a mechanical mechanism operates fewer pistons when rotated on one direction than when the direction of rotation is reversed. Typically a forward rotation operates two pistons, while a reverse rotation causes one piston to operate. The problem is that the optimal conditions for opening the starting relay are different for either direction because of the different mechanical loading. Therefore what is also needed is a system to vary the operation of the capacitor start relay as a function of desired rotational direction.

Yet another problem in CSCR motor operation is the reliability of the motor start capacitor relay. Even if the motor start capacitor relay is operated at the correct time for the correct mechanical rotor condition, an arc caused by opening the motor start capacitor relay can reduce the life of the relay or even cause a contact failure that can destroy the capacitor or motor by then failing to remove the start capacitor from the circuit following an otherwise successful motor start. Therefore what is also needed is a system to open the motor start capacitor relay so as to cause minimal electrical stress to the electrical contacts of the relay.

SUMMARY OF THE INVENTION

A motor starting apparatus includes a motor starting relay to switch a motor starting capacitor into a motor circuit across a run capacitor. The motor starting capacitor increases an alternating current (AC) current flow through a motor winding to start the motor. The motor starting apparatus also includes a system control to control the motor starting relay and at least one contactor to apply power to the motor starting apparatus. The system control includes an electronic voltage measurement circuit to measure a winding voltage of the motor winding. The system control also includes a microprocessor to run an algorithm that causes the system control to switch the starting capacitor out of the motor circuit when a measured winding voltage exceeds a winding voltage threshold.

A method to start a motor includes the steps of: providing a motor to be started, the motor having a motor start winding; providing a motor starting apparatus including a system control, a motor starting capacitor and a motor starting capacitor relay to switch the motor starting capacitor into the motor circuit and a winding voltage electronic measurement circuit; providing a contactor to supply electrical power to start and run the motor; signaling a motor start to the system control; determining a motor winding voltage threshold; closing the motor starting capacitor relay when needed; closing a contactor to supply power to the motor starting apparatus and the motor circuit; measuring a winding voltage; comparing the measured winding voltage to the voltage threshold; and opening the starting capacitor relay when measured winding voltage exceeds the voltage threshold indicating that the motor has been started.

BRIEF DESCRIPTION OF THE DRAWINGS

For a further understanding of these and objects of the invention, reference will be made to the following detailed description of the invention which is to be read in connection with the accompanying drawing, where.

DETAILED DESCRIPTION OF THE INVENTION

Figure 1:
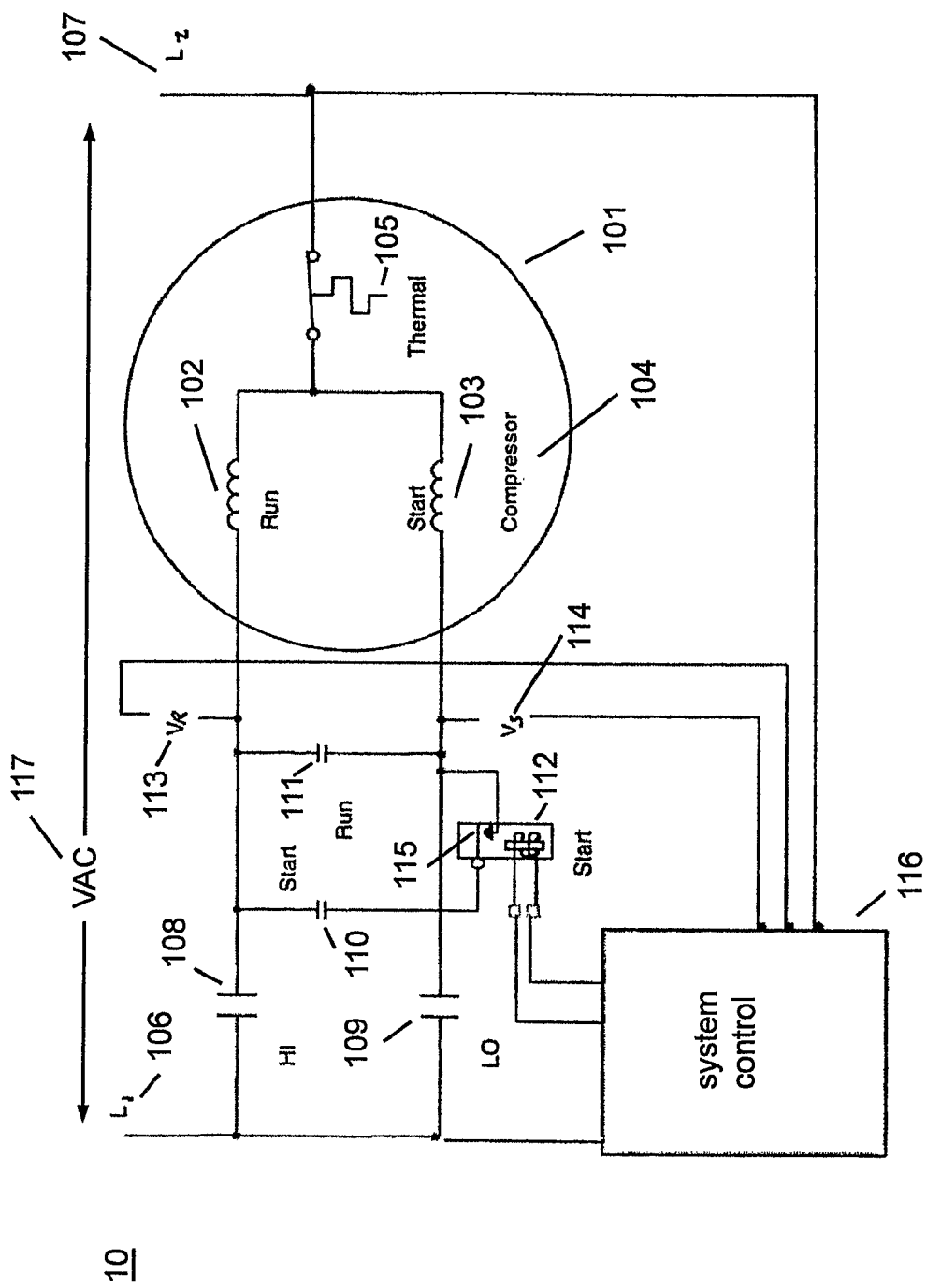
FIG. 1 shows an embodiment of a motor starting apparatus according to the invention.

One embodiment of a motor starting apparatus according to the invention is shown in FIG. 1. The inventive methods and apparatus for starting electric capacitor-start capacitor-run (CSCR) motor 101 involves the operation of start capacitor relay 112. The function of start capacitor relay 112 is to engage start capacitor 110. We describe herein a method and embodiments of corresponding motor start apparatus that can more optimally operate start capacitor relay 112 for both more efficient CSCR motor starts as well as to reduce the likelihood of failure of the CSCR motor 101, the motor start capacitor 110, the start capacitor relay 112 and other related electrical, electronic, and mechanical components.

Various embodiments of the invention solve the problems of inefficient CSCR motor starting by more accurately controlling the operation of start capacitor relay 112 based on measurements and factors that include (individually or in any combination thereof): accurate measurements of CSCR motor winding voltages (potentials); consideration of desired motor direction; control of timing during a CSCR motor start sequence, including elapsed starting time from contactor closure; measured line voltages, measured outdoor temperature. Turning to FIG. 1, we first introduce the components of an exemplary CSCR motor control apparatus that can be used to carry out the various embodiments of the inventive methods. CSCR motor 101 turns a mechanical shaft (not shown) of compressor 104 (not shown in detail). CSCR motor 101 comprises a start winding 103 and a run winding 102. Thermal shutoff 105 senses motor 101 temperature and opens the circuit to both motor windings in the event of an overheat condition. CSCR motor 101 can be powered by line voltage 117, typically the potential between two lines of a multi phase power source, such as two legs of a three phase power source.

CSCR motor 101 rotor shaft motion is caused by a phase difference between the currents in the run and the start windings. This phase difference is maintained by run capacitor 111 that is always present in series with either the run or the start winding as selected by the closure of contactor 108 or contactor 109. The direction of rotation of the rotor shaft (not shown) of CSCR motor 101 is established by closing contactor 108 (HI) or contactor 109 (LO). System control 116 monitors $V_R$ 113, the voltage across the run winding and $V_S$ 114, the voltage across the start winding of motor 101. As will be further described below, by monitoring one or the other, or both of these potentials with time, system control 116 can advantageously determine how long start capacitor 110 needs to be in the circuit, if at all, for an optimized motor 110 start event. Note that compressor 104 mechanically starts with compressor piston motion caused by the onset of CSCR motor 101 rotor motion. Note also that the "start winding" for any given start direction, depends on whether contactor 108 or contactor 109 is energized placing the run and start capacitors in series with one winding or the other. For example, when contactor 108 is closed, line voltage is applied directly to the winding 102 labeled "Run", and through Run capacitor 111 to winding 103 labeled "Start" in FIG. 1. However, if contactor 109 is closed for a reverse motor rotor direction, line voltage is applied directly to winding 103 and phase shifted by capacitor 111 to winding 102.

Optimized motor start events are important because of the electrical, electromechanical, and magnetic forces associated with each motor start. Less optimal starts, as caused by leaving the motor starting capacitor in the circuit for too long a time, can cause damage to the starting capacitor, motor, and the compressor. Catastrophic failure to these components can result from cumulative damage such as by long term poor motor starting timing (leaving the starting capacitor in circuit too long, or not long enough). A single very poorly timed start can also cause catastrophic damage.

Some prior art CSCR motor start systems rely on a fixed delay time (a "timed start") for engaging a motor start capacitor. Other prior art CSCR motor starting systems make use of an electromechanical potential relay, usually a potential relay placed across the start winding or the run winding. When the winding voltage reaches a predetermined potential as set on the potential relay, the relay removes the start capacitor from the start winding circuit.

Start systems based on potential relays, while slightly better than mere timed starts, are still far less than optimal. To make near optimal starts there needs to be a more accurate determination of the voltage across the motor windings than can be made with a potential relay. A typical potential relay as used in motor starting application typically has accuracy on the order of 10%, and then the threshold setting is further a function of potential relay coil resistance according to the coil temperature. Changes in coil resistance caused by changes in coil temperature can cause an additional 10% potential error resulting in a total 20% tolerance. Other factors beyond the accuracy of motor winding voltage that advantageously can lead to a more optimized motor start are motor line voltage, compressor ambient temperature.

Returning to FIG. 1, according to one embodiment of the invention, CSCR motor starting can be improved by use of electronic voltage measurement technologies with temperature compensation, including voltage comparators or analog to digital converters (ADC) as generally represented by system control 116 and motor winding voltages 113 and 114. Such winding voltage measurements can be accurate to about 1% or better as compared to the 10% to 20% accuracy available in prior art motor start systems using electromechanical potential relays. Additional details of exemplary electronics well suited to make accurate voltage measurements in a motor start system control 116 are further described in U.S. patent application Ser. No. 60/760,541 entitled "Integrated Measurement of AC Voltages using the Control Microprocessor of an HVAC System" filed Jan. 20, 2006, which is incorporated by reference herein in its entirety.

Figure 2:
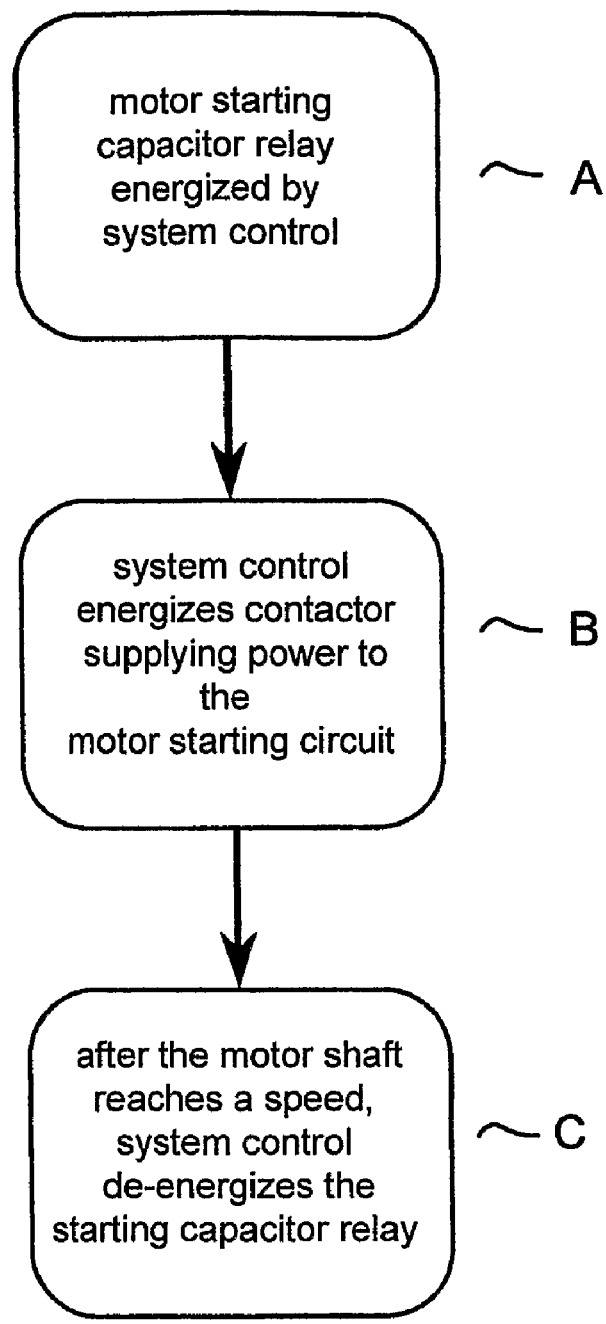
FIG. 2 shows a simplified block diagram of the steps of an exemplary motor starting sequence.

An exemplary motor start sequence using the aforementioned motor winding voltage measurement is illustrated by the block diagram of FIG. 2, and proceeds as follows: (a) motor starting capacitor relay 112 can be actuated by system control 116, causing contacts 115 to close, thus inserting motor starting capacitor 110 into the motor circuit, (b) after a brief delay, system control 116 can energize either contactor 108 or 109 to deliver power to the CSCR compressor motor, starting the compressor in one direction or the other (clockwise or counterclockwise shaft rotation), and (c) when the compressor shaft reaches a predetermined speed, as indicated by a pre-determined motor winding voltage measurement, system control 116 can de-energize the motor starting capacitor relay 112 causing contacts 115 to open, thus removing the motor starting capacitor from the motor circuit. System control 116 adds a delay, before de-energizing start relay 112 causing contacts 115 to open, thus ensuring that the current through contacts 115 is very low at opening. Upon failure to start, the system control de-energizes the contactor 108 or 109 removing system power a short time prior to opening the start relay contacts 115. Using this sequence, contacts 115 of motor starting capacitor relay 112 are advantageously never exposed to the high starting current, because power is not applied to the motor circuit until contactor 108 or 109 is closed, start capacitor 110 power is removed when the capacitor current is very low on a successful start and when the compressor has failed to start, the contactor 108 or 109 removes system power prior to de-energizing the start relay 112. Thus, contacts 115 are less prone to pitting or weld failures. Also note that in this embodiment, exemplary motor starting capacitor relay 112 is a relay having "normally open" contacts and requires power to the coil of motor starting capacitor relay 112 to close the contacts. Thus, in the unlikely failure of the motor starting capacitor relay 112 coil, contacts 115 open and motor starting capacitor 110 is removed from the motor circuit.

According to another embodiment of the invention, desired CSCR rotor direction can be considered when determining a motor winding voltage at which to operated motor start capacitor relay 112 to remove motor start capacitor 112 from the circuit. A decision of threshold voltage determined by rotor direction can be important, because some compressors, for example, the twin single ("TS") compressor manufactured by Bristol Compressors, Inc., have two operating modes. Using a proprietary cam mechanism, the TS compressor operates one piston when the compressor shaft is turned in one direction and two pistons when the shaft is turned in the opposite rotary direction. Thus, the compressor is a two stage compressor, wherein a clockwise compressor rotor direction causes a first compressor capacity stage and a counterclockwise compressor rotor direction causes a second compressor capacity stage. When the rotor of motor 101 is mechanically coupled to the shaft of a TS type compressor 104, the mechanical torque needed to turn the compressor, particularly to turn the compressor shaft past top dead center ("TDC") is different for operation of one piston versus operation of two cylinders. In other words, there are two different mechanical load conditions for clockwise or counter clockwise compressor rotor operation. Therefore in TS configurations, for a more optimal CSCR motor start; two different starting voltage thresholds should be used due to the different loading with rotational direction. The solution is to use separate start voltage thresholds for starting reversible motor compressors in either rotational direction. The start voltage thresholds can be stored in microprocessor memory to be read and used at startup.

In terms of the exemplary CSCR motor starting apparatus of FIG. 1, System control 116 can commands a particular rotor direction (i.e. clockwise or counterclockwise) by activating contactor 108 or contactor 109. An algorithm running on a microcontroller on system control 116 that commands direction and/or has access to the commanded rotor direction and can select the suitable voltage threshold at which to open contacts 115 of motor capacitor start relay 112 based on the commanded rotor direction. Note that only one motor capacitor start relay 112 is needed, regardless of the direction commanded actuating contactor 108 or 109. An exemplary motor start sequence sensitive to commanded motor rotor direction is the same as previously described, except that in step (c) the pre-determined motor rotor speed threshold as indicated by the voltage threshold is different for commanded clockwise rotation than for a commanded counter clockwise rotation.

Figure 3:
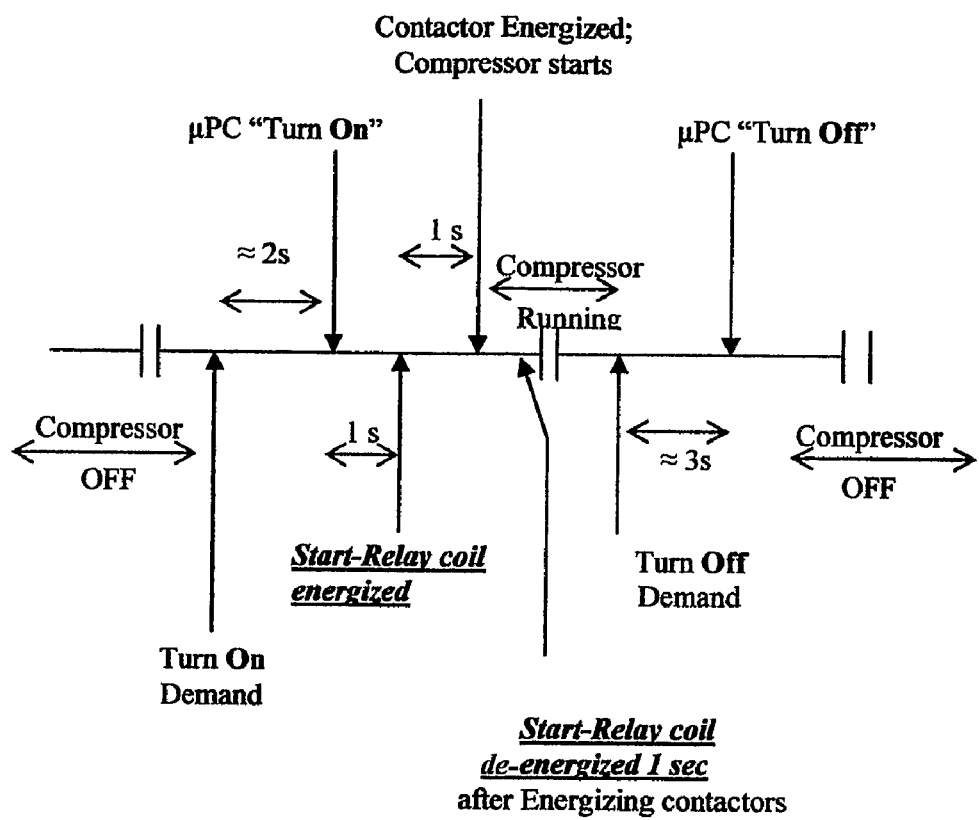
FIG. 3 shows an exemplary time line for operation of a motor starting apparatus.

Yet another embodiment of a CSCR motor starting apparatus 10 can make use of timing delays to further protect CSCR motor 100, motor capacitor start relay 112, motor start capacitor 110 and other motor start apparatus 10 components. Damage to motor capacitor start relay 112 can occur if the relay closes contacts 115 with a high enough residual voltage stored in start capacitor 110. In this case, a high current can be instantaneously driven across relay contacts 115 welding them closed. Also, opening contacts 115 with a large amount of current flowing through them could damage the contacts by transferring contact material from one contact to the other, again possibly welding them. High start circuit voltage can also be present if the contactor is closed before energizing the relay (normal operation) or opened after de-energizing the relay (failure to start mode). However as shown in the exemplary time line diagram of FIG. 3 (and comparing the exemplary time line to the motor starting apparatus shown in FIG. 1) motor capacitor start relay 112 contacts 115 can be closed at least one second before contactor 108 or 109 are energized. Under normal operation, relay contacts 115 will not apply voltage to the start circuit and when a failure to start has occurred, relay contacts 115 will not break voltage to the start circuit, thus avoiding contact 115 damage from high start current. Note that in the exemplary time line of FIG. 3, "μPC" refers to a microprocessor running a control algorithm on system control 116. Compressor refers to a compressor 104 driven by the motor 101, and the contactor is either contactor 108 or 109 depending on which motor shaft direction (clockwise or counter-clockwise is desired).

A bleed resistor (not shown) is a power resistor of a very robust design. A bleed resistor of a relatively high resistance value can be typically connected across the terminals of motor start capacitor 110. The function of the bleed resistor is to dissipate any remaining energy stored in motor start capacitor 110 after motor capacitor start relay 112 contacts 115 open, removing capacitor from motor circuit. A failure of the bleed resistor could cause an incomplete "bleed-down" or discharge of the capacitor voltage causing a welding of the relay contacts on the next start-up. Welded contacts on the following startup would then also likely lead to motor start capacitor 110 failure, since motor start capacitor 110 would be held in the circuit for several seconds until the compressor motor overload trips.

If there is a fault in the motor start apparatus 10, for example, if a bleed-resistor on a motor start capacitor 110 fails open, after motor capacitor start relay 112 contacts 115 open, there might not be enough time for the stored capacitor voltage to internally decay to a safe level before the next start. The problem is that a subsequent start attempt would likely result in contacts 115 welding together as described above. To avoid this possibility, time delays are incorporated that will not allow a successive start attempt until motor start capacitor 110 has been sufficiently bled down following either a failed or a successful start. Even without a bleed resistor, motor start capacitor 110 can discharge internally by itself, albeit over a longer time period than needed with the assistance of a bleed resistor. Therefore, to allow for discharge by internal discharge in the event of a bleed resistor failure, the minimum system run time after a successful start can be set to a minimum of 3 minutes a minimum time between start attempts can be set to five minutes.

A related problem is that the start capacitor will likely fail if kept in the circuit too long. At the voltage and current levels generated by the motor with the start gear engaged, permissible capacitor duty cycle is about 1 second on time and 59 seconds off time. The off time is needed to prevent damage from high capacitor currents and to allow any internal heat generated during the ON period to dissipate. The solution to this problem is to only energize motor capacitor start relay 112 for 1 second or less, after contactor 108 or 109 is energized to apply circuit voltage. If the compressor has not started by this time, it is considered a "No Start", and the contactor 108 or 109 can be de-energized, to remove circuit voltage. The start relay can be de-energized one second later to allow the start capacitor voltage in this case to bleed to a safe level through the compressor windings and to minimize the current that the relay contacts break. The windings offer little resistance to the bleed down current thus; bleed down is at a faster rate than through the bleed resistor. Also, no large currents exist between the motor start capacitor 110 and run capacitor 111 since they are at the same voltage level at all times during the bleed down period. If the compressor fails to start, system control 116 can be pre-programmed wait 5 minutes to try again. If there are 3 consecutive "No starts", there can further be a 30-minute delay before the next compressor start try. These two delays can help to protect motor start capacitor 110 by maintaining operation within its rated duty cycle. Thus, the algorithm can limit the time voltage is applied to the start capacitor so as not exceed the start capacitor duty cycle limit.

EXAMPLE

Figure 4A:
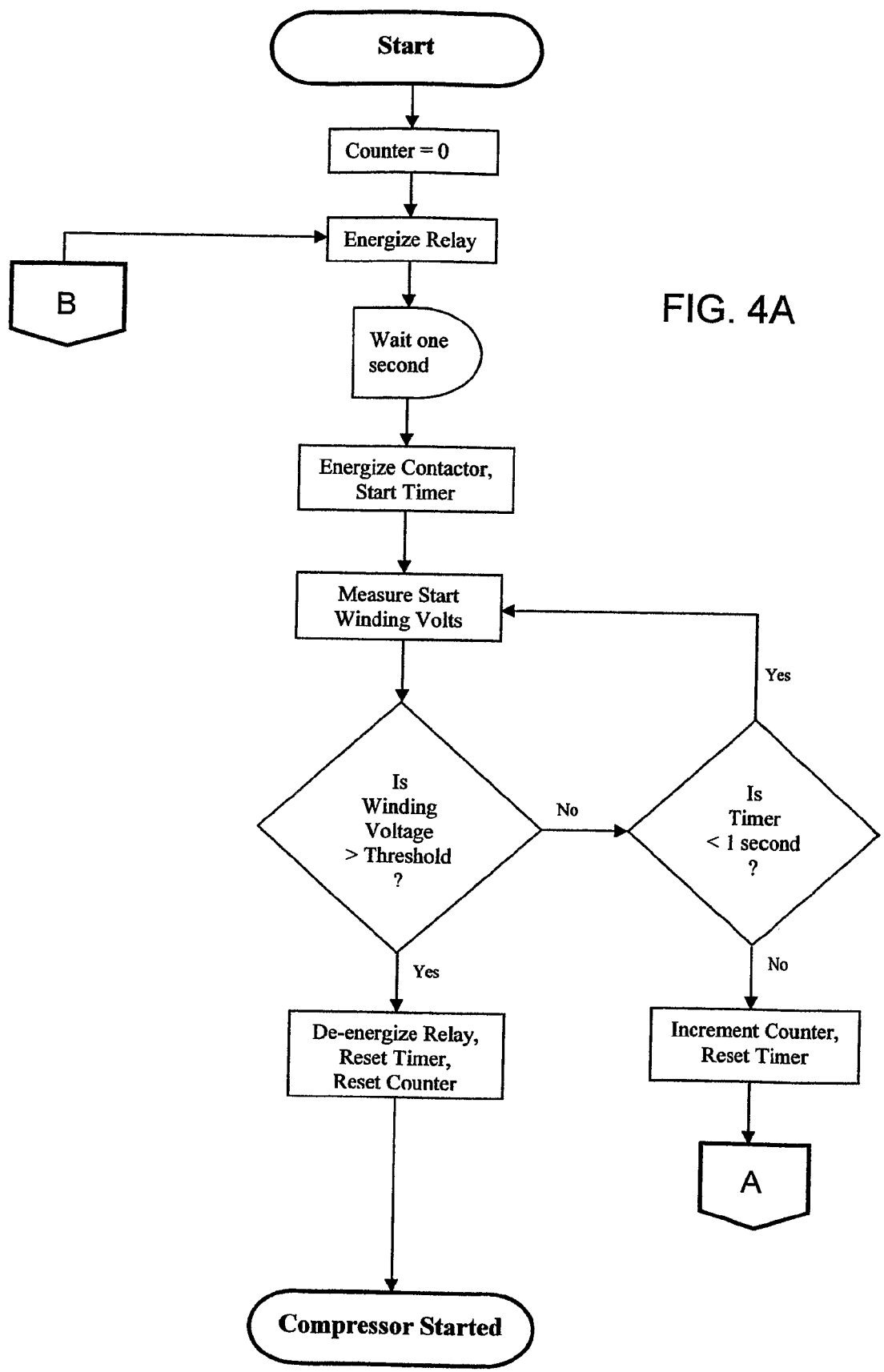
FIG. 4A is sheet one of an exemplary algorithm that can be run on the system control.
Figure 4B:
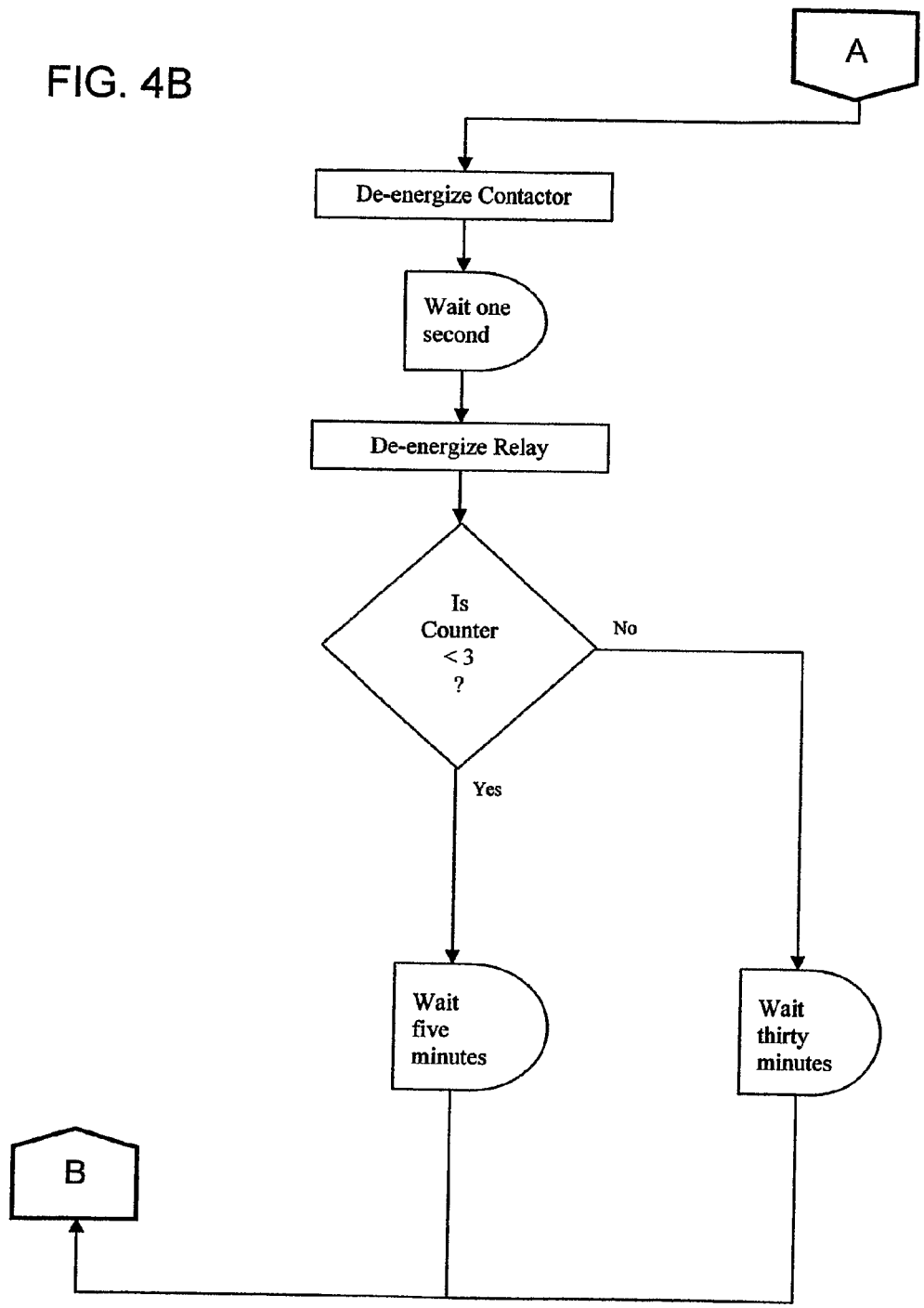
FIG. 4B is sheet two of an exemplary algorithm that can be run on the system control.

FIGS. 4A and 4B show a flow chart (one flow chart drawn across two drawing sheets) of an algorithm that can run on a microprocessor on system control in a preferred embodiment using both voltage thresholds and time delays as previously described. The sequence of steps begins at "start". A counter, that can be used to monitor the number of successive start attempts, is initialized to "0". A motor capacitor start relay is energized and then after 1 second, a motor start contactor applies electrical power to a motor start circuit. The system control monitors a motor winding by taking a voltage measurement. The voltage measurement is compared to a winding voltage threshold. If the voltage measurement indicates that the motor is up to a threshold rotor speed, as indicated by reaching the threshold voltage, the start relay is de-energized and the compressor runs normally after a "good" start. On the other hand, if the voltage measurement is below the threshold voltage, the algorithm loops, taking successive voltage measurements and comparing each measurement to the threshold value until the threshold value is reached, or the timer reaches 1 second and "times out" causing the start counter to increment by one and the timer to reset. Then the contactor is de-energized, a time delay of 1 second occurs, and then the motor start relay is de-energized. The counter is then checked to see how many start attempts have occurred. If less than 3 start attempts have occurred, another start attempt is made after a 5 minute delay. If 3 unsuccessful start attempts occur in succession, a thirty minute delay is introduced, before trying the next start attempt. Note that if the compressor starts successfully on a fourth try after the 30 minute delay, both the timer and counter are reset to zero. By use of such relatively long time delays, momentary fault conditions can be automatically tolerated without otherwise causing the electromechanical fault protection device to trip in a way that would likely require the intervention of a repair technician to restart the failed system and corresponding long down time of a home or office comfort system.

In yet another embodiment, instead of relying on just one start voltage threshold, or two start voltage thresholds, one for each rotor direction, the voltage threshold can be calculated based on one or more measurements. For example, the start winding voltage generated by the compressor can be shown to increase or decrease with the line voltage increase or decrease, during starting. A system control can continuously or periodically measure the line voltage used to power the motor start apparatus and then one or more start voltage thresholds can be adjusted to compensate for high or low line voltages. In fact, for some high line voltage conditions, for a given motor and compressor, the motor start capacitor might not be needed. This information can be used by a program running on a system control.

In yet another embodiment, the system control can have a measurement input of an outdoor temperature. A combination of outdoor temperature and compressor "off" time can be important factors used to determine an optimal voltage threshold. For example, after a long off time, the refrigeration circuit equalizes suction to discharge pressure differential thus reducing the starting torque requirement to a point where a starting capacitor assist is not required. Limiting the number of times the motor starting capacitor is actually used can improve the life of both the motor starting capacitor and the starting capacitor relay. Moreover, starts made at lower torque levels improve the life of the compressor since these starts can be done with reduced stress to the windings, rotor, laminations, bearings, and throw blocks.

In still another embodiment of the invention, the contactors can be operated only when the motor starting capacitor is engaged and the capacitor voltage and/or the line voltage is measured to be near zero volts. Compressor motor starting can thus still further be improved by also only operating the starting capacitor relay at a point of minimum potential on an AC sinusoid. A minimum potential is defined herein to be a voltage of 10% or less of the peak AC voltage under consideration.

It should be noted that system control 116 can run one or more algorithms as have been described to carry out the inventive methods of the various embodiments of the invention. Typically such algorithms run as software or firmware on a microprocessor. The term microprocessor (or microcomputer) as used herein includes a microcontroller the generally includes memory an input output (I/O) functions in the microcontroller package or a microprocessor accompanied by a separate memory and separate I/O on system control 116. Other suitable processors to run such algorithms include, but are not limited to, microprocessors, microcontrollers or complex logic elements such as field programmable gate arrays (FPGA), other types of gate arrays, or other types of programmable logic that can perform processor like functions to run a program to perform the functions described herein.

The term electronic measurement circuit refers to electronic circuits including voltage comparators and all suitable types of analog to digital converters (ADC) and also includes electronic measurement circuits contained within microcontrollers. The term electronic measurement circuit does not include prior art electromechanical potential relays.

Motor capacitor start relay 112 has been described as an electromechanical relay having contacts 115. It should be noted that an electronic or electrical switching device with suitable contact ratings can be used in place of a relay. For example, other types or contactors or solenoid operated contacts could also be used in place of a conventional relay.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A motor starting apparatus comprising:
    a motor starting relay to switch a motor starting capacitor into a motor circuit across a run capacitor, the motor starting capacitor to increase an alternating current (AC) current flow through a motor winding to start the motor; and
    a system control to control the motor starting relay and at least one contactor to apply power to the motor starting apparatus, wherein the system control comprises an electronic voltage measurement circuit to measure a winding voltage of the motor winding, the system control also comprising a microprocessor to run an algorithm that causes the system control to switch the starting capacitor out of the motor circuit when a measured winding voltage exceeds a winding voltage threshold.

2. The motor starting apparatus of claim 1 further comprising at least two winding voltage thresholds, wherein a first winding voltage threshold is used for a commanded clockwise motor rotor rotation and a second winding voltage threshold is used for a counter clockwise motor rotor direction.

3. The motor starting apparatus of claim 2 wherein the motor starting apparatus is used to start a capacitor start capacitor run (CSCR) motor to turn a compressor rotor on a two stage compressor, and wherein a clockwise compressor rotor direction causes a first compressor capacity stage and a counterclockwise compressor rotor direction causes a second compressor capacity stage.

4. The motor starting apparatus of claim 1 wherein the system control further measures a line voltage, the line voltage to power the motor starting apparatus and the motor circuit, and the system control calculates the winding voltage threshold based at least in part on the measured line voltage.

5. The motor starting apparatus of claim 1 wherein the system control further measures an outdoor temperature, and the system control calculates the winding voltage threshold based at least in part on the measured outdoor temperature.

6. The motor starting apparatus of claim 1 wherein the algorithm running on the system control commands closure of the contactor to apply power to the motor circuit without switching a motor starting capacitor into a motor circuit where the algorithm determines that the motor starting capacitor is not required for a particular motor start event.

7. The motor starting apparatus of claim 6 wherein the decision not to switch in the motor start capacitor is based on a measurement selected from the group of measurements consisting of line voltage, rotor direction, compressor off time, and outdoor temperature.

8. The motor start apparatus of claim 1 wherein the algorithm comprises a counter to count a number of successive start attempts from a last successful motor start event, the algorithm to add a time delay between unsuccessful start attempts.

9. The motor start apparatus of claim 8 wherein the time delay is at least 5 minutes for a first three unsuccessful start attempts, and at least 30 minutes following a third unsuccessful start attempt.

10. The motor starting apparatus of claim 1 wherein the algorithm running on the system control adds a time delay between energizing the motor starting relay and closing the contactor to apply power to the motor circuit, or the algorithm running on the system control adds a time delay to limit the time voltage is applied to the start capacitor to not exceed a start capacitor duty cycle limit.

11. The motor starting apparatus of claim 1 wherein the algorithm causes the system control to switch the starting capacitor out of the motor circuit when a measured winding voltage exceeds a winding voltage threshold and the voltage on an AC sinusoid of the line voltage is within 10% of a minimum voltage.

12. A method to start a motor comprising the steps of:
providing a motor to be started, the motor having a motor circuit including a motor start winding;
providing a motor starting apparatus including a system control, a motor starting capacitor and a motor starting capacitor relay to switch the motor starting capacitor into the motor circuit and a winding voltage electronic measurement circuit;
providing a contactor to supply electrical power to start and run the motor;
signaling a motor start to the system control;
determining a motor winding voltage threshold;
closing the motor starting capacitor relay when needed;
closing a contactor to supply power to the motor starting apparatus and the motor circuit;
measuring a winding voltage;
comparing the measured winding voltage to the voltage threshold; and
opening the starting capacitor relay when measured winding voltage exceeds the voltage threshold indicating that the motor has been started.

13. The method of claim 12 wherein the step of determining a motor winding voltage threshold comprises the step of determining a motor winding voltage threshold based on a commanded motor rotor clockwise or counterclockwise direction.

14. The method of claim 13 wherein the step of providing a motor to be started comprises the step of providing a capacitor start capacitor run (CSCR) motor to be started, to turn a compressor rotor on a two stage compressor, and wherein a clockwise compressor rotor direction causes a first compressor capacity stage and a counterclockwise compressor rotor direction causes a second compressor capacity stage, the motor having a motor start winding.

15. The method of claim 12 wherein the step of determining a motor winding voltage threshold comprises the step of determining a motor winding voltage threshold wherein the system control further measures a line voltage of the electrical power, and the winding voltage threshold is determined at least in part based on the measured line voltage.

16. The method of claim 12 wherein the step of determining a motor winding voltage threshold comprises the step of determining a motor winding voltage threshold wherein the system control further measures an outdoor temperature, and the winding voltage threshold is determined at least in part based on the measured outdoor temperature.

17. The method of claim 12 wherein the step of closing the motor starting capacitor relay when needed comprises the step of closing the motor starting capacitor relay when needed, wherein the need is determined based on a measurement selected from the group of measurements consisting of line voltage, rotor direction, compressor off time, and outdoor temperature.

18. The method of claim 12 further comprising the steps of counting a number of successive start attempts from a last successful motor start event, and adding a time delay between unsuccessful start attempts.

19. The method of claim 18 wherein the step of adding a time delay comprises the step of adding a time delay between unsuccessful start attempts wherein the time delay is at least 5 minutes for a first three unsuccessful start attempts, and at least 30 minutes following a third unsuccessful start attempt.

20. The method of claim 12 further comprising the step of adding a delay between the step of closing the motor starting capacitor relay when needed and the step of closing a contactor to supply power to the motor starting apparatus and the motor circuit, or before the step of opening the starting capacitor relay adding a delay from an opening of the contactor to remove power to the motor starting apparatus and the motor circuit where the motor failed to reach the voltage threshold.

* * * * *